(12) United States Patent
Shin et al.

(10) Patent No.: US 8,512,600 B2
(45) Date of Patent: Aug. 20, 2013

(54) POLYCARBONATE RESIN COMPOSITION HAVING EXCELLENT WEAR RESISTANCE AND ELECTRIC CONDUCTIVITY AND METHOD OF PREPARING THE SAME

(75) Inventors: Young Min Shin, Uiwang-si (KR); Sang Wan Kim, Yeongdeungpo-gu (KR); Young Kyu Chang, Gunpo-si (KR); Young Sil Lee, Gunpo-si (KR)

(73) Assignee: Cheil Industries Inc., Gumi-si (KR)

( * ) Notice: Subject to any disclaimer, the term of this patent is extended or adjusted under 35 U.S.C. 154(b) by 270 days.

(21) Appl. No.: 12/968,426

(22) Filed: Dec. 15, 2010

(65) Prior Publication Data
US 2011/0155965 A1  Jun. 30, 2011

(30) Foreign Application Priority Data

Dec. 30, 2009 (KR) .............................. 2009-0134952

(51) Int. Cl.
*H01B 1/20* (2006.01)

(52) U.S. Cl.
USPC ........... 252/502; 252/500; 252/510; 252/511; 524/59; 524/205; 977/742; 977/773; 977/783; 977/788

(58) Field of Classification Search
USPC ........... 252/500–511; 524/59, 205; 977/742; 977/773, 783, 788
See application file for complete search history.

(56) References Cited

U.S. PATENT DOCUMENTS

| | | | |
|---|---|---|---|
| 5,629,094 A | 5/1997 | Sakakibara et al. | |
| 5,795,500 A | 8/1998 | Law et al. | |
| 6,528,572 B1 | 3/2003 | Patel et al. | |
| 6,734,262 B2 | 5/2004 | Patel | |
| 6,746,627 B2 | 6/2004 | Niu et al. | |
| 6,942,823 B2 | 9/2005 | Terada et al. | |
| 7,060,241 B2 | 6/2006 | Glatkowski | |
| 7,226,989 B2 | 6/2007 | Silvi et al. | |
| 7,238,415 B2 | 7/2007 | Rodriquez et al. | |
| 7,307,120 B2 | 12/2007 | Nodera | |
| 7,309,727 B2 | 12/2007 | Elkovitch et al. | |
| 7,413,684 B2 | 8/2008 | Fishburn et al. | |
| 7,462,656 B2 | 12/2008 | Keulen et al. | |
| 7,696,274 B2 | 4/2010 | Terada et al. | |
| 7,928,156 B2 | 4/2011 | Berzinis | |
| 8,088,306 B2 * | 1/2012 | Kim et al. ........... | 252/511 |
| 8,128,844 B2 * | 3/2012 | Kim et al. ........... | 252/511 |
| 2002/0106574 A1 | 8/2002 | Haneda et al. | |
| 2003/0092824 A1 * | 5/2003 | Bastiaens et al. ........... | 524/495 |

(Continued)

FOREIGN PATENT DOCUMENTS

| | | |
|---|---|---|
| CN | 1864233 A | 11/2006 |
| JP | 2001-242725 A | 9/2001 |

(Continued)

OTHER PUBLICATIONS

International Search Report in commonly owneed International Application No. PCT/KR2008/007360, dated Jul. 9, 2009, pp. 1-2.

(Continued)

*Primary Examiner* — Tri V Nguyen

(74) *Attorney, Agent, or Firm* — Summa, Additon & Ashe, P.A.

(57) ABSTRACT

The present invention provides a polycarbonate resin composition comprising a polycarbonate (A), a styrene copolymer resin (B), carbon nano-tubes (C) and a carbon black (D).

7 Claims, 2 Drawing Sheets

(56) References Cited

U.S. PATENT DOCUMENTS

| | | | |
|---|---|---|---|
| 2003/0111646 A1 | 6/2003 | Niu et al. | |
| 2003/0116757 A1 | 6/2003 | Miyoshi et al. | |
| 2003/0203990 A1 | 10/2003 | DeRudder et al. | |
| 2004/0144963 A1 | 7/2004 | Braig et al. | |
| 2005/0171297 A1* | 8/2005 | Koevoets et al. | 525/433 |
| 2005/0228109 A1* | 10/2005 | Chandra et al. | 524/495 |
| 2005/0228130 A1* | 10/2005 | Kalyanaraman et al. | 525/67 |
| 2005/0234219 A1 | 10/2005 | Silvi et al. | |
| 2006/0004154 A1* | 1/2006 | DeRudder et al. | 525/469 |
| 2006/0014084 A1 | 1/2006 | French et al. | |
| 2006/0089434 A1 | 4/2006 | Nodera | |
| 2006/0116443 A1* | 6/2006 | Probst et al. | 523/215 |
| 2006/0135636 A1 | 6/2006 | Zhu et al. | |
| 2006/0142455 A1 | 6/2006 | Agarwal et al. | |
| 2006/0199879 A1* | 9/2006 | Agarwal | 523/201 |
| 2006/0222422 A1 | 10/2006 | Takenaka et al. | |
| 2006/0235113 A1 | 10/2006 | Dorgan et al. | |
| 2007/0100113 A1 | 5/2007 | Kamps et al. | |
| 2007/0292173 A1 | 12/2007 | Ikeda et al. | |
| 2007/0299169 A1* | 12/2007 | Ohira et al. | 524/100 |
| 2008/0090965 A1 | 4/2008 | Kim | |
| 2008/0152895 A1 | 6/2008 | Law | |
| 2008/0188604 A1 | 8/2008 | Cogen et al. | |
| 2008/0194736 A1* | 8/2008 | Lu | 524/35 |
| 2008/0214699 A1* | 9/2008 | Halahmi et al. | 523/222 |
| 2008/0230251 A1 | 9/2008 | Lin et al. | |
| 2009/0321687 A1* | 12/2009 | Kim et al. | 252/507 |
| 2009/0326134 A1 | 12/2009 | Berzinis | |
| 2010/0078194 A1* | 4/2010 | Bhatt et al. | 174/110 SR |
| 2010/0160539 A1* | 6/2010 | Sasaki | 524/577 |
| 2010/0190878 A1* | 7/2010 | Maruyama | 521/90 |
| 2010/0247891 A1* | 9/2010 | Chang et al. | 428/220 |
| 2011/0155965 A1* | 6/2011 | Shin et al. | 252/511 |
| 2011/0204298 A1* | 8/2011 | Chang et al. | 252/508 |

FOREIGN PATENT DOCUMENTS

| | | |
|---|---|---|
| JP | 2002-006642 A | 1/2002 |
| JP | 2004-168966 A | 6/2004 |
| JP | 2005-134840 A | 5/2005 |
| JP | 2006-083195 | 3/2006 |
| JP | 2007-272223 A | 10/2007 |
| KR | 10-2006-0052657 A | 5/2006 |
| KR | 10-2006-0120023 A | 11/2006 |
| KR | 10-0706651 B1 | 4/2007 |
| KR | 10-2007-0058443 A | 6/2007 |
| WO | 2008/078849 A1 | 7/2008 |
| WO | 2008/078850 A1 | 7/2008 |
| WO | 2009/020261 A1 | 2/2009 |
| WO | 2009/075543 A2 | 6/2009 |

OTHER PUBLICATIONS

International Search Report in commonly owned International Application No. PCT/KR2006/005856, mailed Sep. 20, 2007, pp. 1-2.
Chinese Office Action in commonly owned Chinese Application No. 200680056762.7 dated Mar. 24, 2011, pp. 1-5.
English translation of Chinese Office Action in commonly owned Chinese Application No. 200680056762.7 dated Mar. 24, 2011, pp. 1-6.
Chinese Office Action in commonly owned Chinese Application No. 200780100179 dated Apr. 14, 2011, pp. 1-4.
English translation of Chinese Office Action in commonly owned Chinese Application No. 200780100179 dated Apr. 14, 2011, pp. 1-5.
International Search Report in commonly owned International Application No. PCT/KR2007/007008, dated Apr. 28, 2008, pp. 1-2.
International Search Report in commonly owned International Application No. PCT/KR2006/005857, mailed Aug. 23, 2007, pp. 1-2.
Office Action in commonly owned U.S. Appl. No. 12/672,317 mailed on Apr. 25, 2012, pp. 1-12.
Final Office Action in commonly owned U.S. Appl. No. 12/672,317 mailed on Nov. 2, 2012, pp. 1-9.
Office Action in commonly owned U.S. Appl. No. 12/488,771 mailed on May 5, 2011, pp. 1-7.
Notice of Allowance in commonly owned U.S. Appl. No. 12/488,771 mailed on Sep. 1, 2011, pp. 1-6.
Office Action in commonly owned U.S. Appl. No. 12/492,403 mailed on May 17, 2011, pp. 1-7.
Notice of Allowance in commonly owned U.S. Appl. No. 12/492,403 mailed on Oct. 31, 2011, pp. 1-7.
Supplemental Notice of Allowabiltiy in commonly owned U.S. Appl. No. 12/492,403 mailed on Dec. 15, 2011, pp. 1-7.
Office Action in commonly owned U.S. Appl. No. 12/813,574 mailed on Oct. 11, 2011, pp. 1-17.
Final Office Action in commonly owned U.S. Appl. No. 12/813,574 mailed on Mar. 6, 2012, pp. 1-15.
Office Action in commonly owned U.S. Appl. No. 12/813,574 mailed on Jul. 12, 2012, pp. 1-12.
Final Office Action in commonly owned U.S. Appl. No. 12/813,574 mailed on Jan. 29, 2013, pp. 1-12.

* cited by examiner (a)  (b)  (c)

POLYCARBONATE RESIN COMPOSITION HAVING EXCELLENT WEAR RESISTANCE AND ELECTRIC CONDUCTIVITY AND METHOD OF PREPARING THE SAME

CROSS-REFERENCE TO RELATED APPLICATIONS

This application claims priority from Korea Patent Application No. 2009-0134952, filed on Dec. 30, 2009, in the Korean Intellectual Property Office, the disclosure of which is incorporated herein by reference in its entirety.

FIELD OF THE INVENTION

The present invention relates to a polycarbonate resin composition that can have excellent wear resistance and electric conductivity and a method of preparing the same.

BACKGROUND OF THE INVENTION

Trays used to transfer items such as wafers, IC chips, electronic components and the like should have antistatic properties. Therefore, traditionally, such trays have been formed of plastic materials treated to have conductive properties, such as ABS resin mixed with antistatic agents, carbon black, carbon fiber, carbon nano-tubes and the like.

Antistatic agents, however, can be easily affected by humidity because of ion conductivity. Antistatic properties can also deteriorate over time as antistatic agents are lost through use or washing. In addition, polymers mixed with large amounts of antistatic agents can exhibit deteriorated physical properties such as heat resistance.

Carbon black is not affected by humidity, washing and the like. However, adding large amounts of carbon black is required to impart conductive properties, and the surface of the plastic article can become susceptible to scratches and abrasion. Accordingly the plastic article can exhibit reduced abrasion resistance and carbon particles can be easily lost from the article.

Carbon fiber resin can influence the properties of electrical parts since the particles can protrude from an exterior part of a plastic article and be broken off, and the resin per se has high strength. Additionally, when treating a head or an IC chip with ultrasonic waves, the products can be damaged by debris from the carbon fiber per se and/or resin debris from the carbon fiber surface, resulting from contact between particles.

SUMMARY OF THE INVENTION

The present invention provides a polycarbonate resin composition that can have excellent wear resistance and/or electric conductivity. The polycarbonate resin composition of the invention comprises a polycarbonate (A), a styrene copolymer resin (B), carbon nano-tubes (C) and carbon black (D). In exemplary embodiments of the present invention, the carbon nano-tubes (C) and the carbon black (D) can form three dimensional network structures.

The carbon black (D) can be conductive globular carbon black having a particle size of about 1 to about 100 nm.

The styrene copolymer resin (B) can include about 60 to about 90% by weight of a styrene monomer and about 10 to about 40% by weight of an unsaturated nitrile monomer.

The polycarbonate resin composition can include about 0.01 to about 5 parts by weight of the carbon nano-tubes (C) and about 1 to about 20 parts by weight of the carbon black (D), based on 100 parts by weight of a base resin comprising about 45 to about 95% by weight of the polycarbonate (A) and about 5 to about 55% by weight of the styrene copolymer resin (B).

The polycarbonate resin composition extruded at 280° C. can have a surface resistance of about E+5 or less according to ASTM D257. The polycarbonate resin composition extruded at 280° C. can also have an abrasion loss of about 30 mg or less measured under conditions of a pressure of 3 Kgf, 1000 rpm, and 200° C. for 4 and a half hours.

The present invention further provides a method for preparing a polycarbonate resin composition that can have excellent wear resistance and electric conductivity. In the method, the polycarbonate composition is prepared by mixing polycarbonate (A), a styrene copolymer resin (B), carbon nano-tubes (C) and carbon black (D). In exemplary embodiments of the method of the invention, the carbon nano-tubes (C) and the carbon black (D) can form three-dimensional network structures.

The present invention further provides a plastic article prepared using the polycarbonate resin composition. In exemplary embodiments of the present invention, the plastic article is an anti-charge (anti-static) tray.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
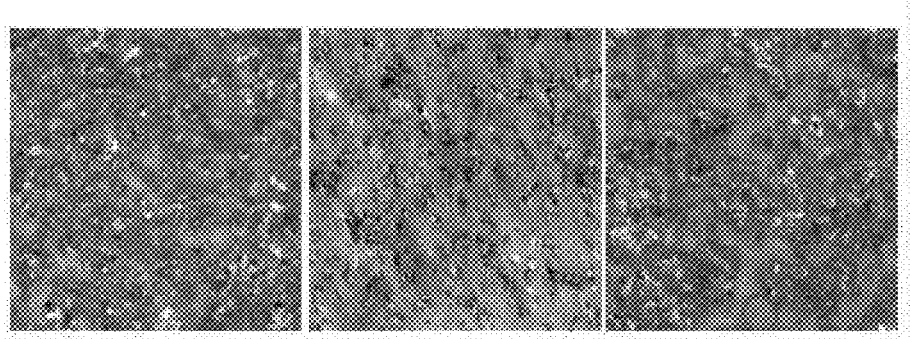
FIGS. 1(a), (b), and (c) are transmission electron microscope (TEM) photographs of a surface of Examples 1, 2 and 3, respectively.

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a polycarbonate resin composition comprising a polycarbonate (A), a styrene copolymer resin (B), a carbon nano-tube (C) and carbon black (D).

In exemplary embodiments of the present invention, the polycarbonate resin composition includes a base resin including about 45 to about 95% by weight of the polycarbonate (A) and about 5 to about 55% by weight of the styrene copolymer resin (B); about 0.01 to about 5 parts by weight of the carbon nano-tube (C) based on 100 parts by weight of the base resin including polycarbonate (A) and styrene copolymer resin (B); and about 1 to about 20 parts by weight of the carbon black (D) based on 100 parts by weight of the base resin including polycarbonate (A) and styrene copolymer resin (B).

(A) Polycarbonate Resin

The polycarbonate resin useful in the present invention may be prepared by reacting one or more diphenols represented by Chemical Formula 1 with a compound comprising a phosgene, a halogen formate, a carbonate diester or a combination thereof.

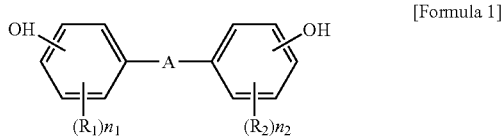

[Formula 1]

wherein:

A is a single bond, substituted or unsubstituted linear or branched C1 to C30 alkylene, substituted or unsubstituted C2 to C5 alkenylene, substituted or unsubstituted C2 to C5 alkylidene, substituted or unsubstituted linear or branched C1 to C30 haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted linear or branched C1 to C20 alkoxylene, halogene acid ester, carbonic acid ester, CO, S or $SO_2$, each of $R_1$ and $R_2$ is independently substituted or unsubstituted C1 to C30 alkyl or substituted or unsubstituted C6 to C30 aryl, and $n_1$ and $n_2$ are independently integers ranging from 0 to 4.

As used herein, when a specific definition is not otherwise provided, the terms "substituted alkyl," "substituted alkylene," "substituted alkylidene," "substituted haloalkylene," "substituted cycloalkylene," "substituted cycloalkenylene," "substituted cycloalkylidene," "substituted aryl," "substituted arylene," and "substituted alkoxylene" independently refer to alkyl, alkylene, alkylidene, haloalkylene, cycloalkylene, cycloalkenylene, cycloalkylidene, aryl, arylene, and alkoxylene substituted with one or more of halogen, C1 to C30 alkyl, C6 to C30 aryl, C2 to C30 heteroaryl, or C1 to C20 alkoxy.

Examples of diphenols of Chemical Formula 1 may include without limitation hydroquinol, resocinol, 4,4'-dihydroxy diphenyl, 2,2-bis-(4-hydroxyphenyl)-propane, 2,4-bis-(4-hydroxyphenyl)-2-methyl buthane, bis-(4-hydroxyphenyl)methane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3,5-dichloro-4-hydroxyphenyl)propane, 2,2-bis-(4-hydroxyphenyl)ketone, bis(4-hydroxyphenyl)ether and the like, and mixtures thereof.

From among these, 2,2-bis-(4-hydroxyphenyl)-propane, 2,2-bis-(3,5-dichloro-4-hydroxyphenyl)-propane, 1,1-bis-(4-hydroxyphenyl)-cyclohexane and the like may be used in exemplary embodiments. 2,2-bis-(4-hydroxyphenyl)-propane (also referred to as bisphenol-A, BPA) may be used in other exemplary embodiments.

The polycarbonate resin may have without limitation a weight average molecular weight (Mw) of about 10,000 to about 200,000 g/mol, for example about 15,000 to about 80,000 g/mol.

The polycarbonate resin may be a copolymer or a mixture of copolymers prepared by reacting two or more kinds of diphenols. The polycarbonate resin may also include linear polycarbonate resin, branched polycarbonate resin, polyestercarbonate copolymer resin and the like, and combinations thereof.

Examples of the linear polycarbonate resin include without limitation bisphenol-A polycarbonate resin and the like. The branched polycarbonate resin may be prepared by reacting multifunctional aromatic compound such as trimellitic anhydride, trimelliticaicd and the like with diphenols and carbonate compound. The multifunctional aromatic compound may include about 0.05 to about 2% by mole, per total amount of the branched polycarbonate resin. The polyester-carbonate copolymer resin may be prepared by reacting bifunctional carboxylic acid with diphenols and carbonate. Examples of the carbonate include diarylcarbonates such as diphenylcarbonate, ethylene carbonate and the like.

The polycarbonate of the present invention may be prepared without limitation by interfacial polymerization or melt methods using ester exchange reactions which react dihydroxy compound with dicarbonate compound.

The polycarbonate resin composition of the present invention may include the polycarbonate in an amount of about 45 to about 95% by weight based on the total weight of a base resin including the polycarbonate (A) and the styrene copolymer resin (B). In some embodiments, the base resin may include the polycarbonate resin (A) in an amount of about 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the polycarbonate resin (A) in the base resin can be in a range from about any of the foregoing amounts to about any other of the foregoing amounts.

(B) Styrene Copolymer Resin

The styrene copolymer resin (B) of the present invention can be a resin prepared by copolymerizing styrene monomer and unsaturated nitrile monomer. Examples of the styrene monomer may include without limitation styrene, α-methyl styrene, p-methyl styrene, 4-tert butyl styrene, 2,5-dimethyl styrene, vinyl toluene and the like and combinations thereof. Examples of the unsaturated nitrile monomer may include without limitation methacrylronitrile, acrylronitrile and the like, and combinations thereof.

In an exemplary embodiment, the styrene copolymer resin may be prepared by any well-known method such as emulsion polymerization, suspension polymerization, bulk polymerization and the like.

The styrene copolymer can include about 60 to about 90% by weight of the styrene monomer and about 10 to about 40% by weight of the unsaturated nitrile monomer. In some embodiments, the styrene copolymer may include the styrene monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the styrene monomer can be in a range from about any of the foregoing amounts to about any other of the foregoing amounts.

In some embodiments, the styrene copolymer may include the unsaturated nitrile monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the unsaturated nitrile monomer can be in a range from about any of the foregoing amounts to about any other of the foregoing amounts.

If the amount of the unsaturated nitrile monomer is less than about 10% by weight, it can be difficult to disperse conductive fillers (carbon fiber and carbon black) in polycarbonate and form networks as the carbon fiber (C) and the carbon black (D) may migrate towards the styrene copolymer resin due to the small amount of unsaturated nitrile monomer. Accordingly, if the amount of the unsaturated nitrile monomer is less than about 10% by weight, electrical conductivity can deteriorate.

In exemplary embodiments, the polycarbonate resin composition can include the styrene copolymer resin (B) in an amount of about 5 to about 55% by weight based on the total weight of the base resin including the polycarbonate (A) and the styrene copolymer (B). In some embodiments, the base resin may include the styrene copolymer (B) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55% by weight. Further, according to some embodiments of the present invention, the amount of the styrene copolymer (B) in the base resin can be in a range from about any of the foregoing amounts to about any other of the foregoing amounts.

The conductive fillers of the present invention are located in polycarbonate phase. If the amount of the styrene copolymer resin (B) is more that about 55% by weight, the conductivity of the resin composition can be lowered because the amount of the polycarbonate including conductive fillers decreases. However, if the amount of the styrene copolymer resin (B) is less than about 5% by weight, abrasion resistance may decline because the styrene copolymer resin (B) of the present invention can enhance abrasion resistance of the polycarbonate resin composition.

(C) Carbon Nano-Tubes

In exemplary embodiments of the present invention, the carbon nano-tubes can include single wall carbon nano-tubes, double wall carbon nano-tubes, multi wall carbon nano-tubes, cup-stacked carbon nano-fibers shaped in a hollow form with an interior that has multiple layers of truncated cone graphenes stacked therein, and the like, and combinations thereof.

Also, the carbon nano-tubes and/or carbon nano-fibers may be coated by metal materials such as Ni, NiP3, Cu, Fe, Au, Ag, Pb, Co, Sn, and the like and alloys and combinations thereof.

Since it can be difficult to disperse the nano-tubes during the process of making the polycarbonate resin composition, the aspect ratio (ratio to length and diameter of tube) of the carbon nano-tubes can be relatively large. For example, multi wall carbon nano-tubes having a diameter of about 1 to about 30 nm and a length of about 50 µm or less can be used.

The polycarbonate resin composition of the invention can include the carbon nano-tubes in an amount of about 0.01 to about 5 parts by weight, for example about 0.1 to about 1 part by weight, per 100 parts by weight of a base resin including polycarbonate (A) and styrene copolymer (B). In some embodiments, the polycarbonate resin composition may include the carbon nano-tubes (C) in an amount of about 0.01, 0.02, 0.03, 0.04, 0.05, 0.6, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the amount of the carbon nano-tubes (C) can be in a range from about any of the foregoing amounts to about any other of the foregoing amounts.

If the carbon nano-tubes are used in an amount within these ranges, they may exhibit electrical percolation to achieve conductivity for the polycarbonate composition and may also maintain physical properties such as heat stability, tensile strength and the like because the composition can be suitably processed to obtain a homogeneous dispersion of carbon nano-tubes within the polycarbonate resin composition.

(D) Carbon Black

In exemplary embodiments of the present invention, the carbon black may include ketjen black, acetylene black, furnace black, channel black and the like, and combinations thereof. The carbon black can be for example ketjen black which can provide excellent conductivity.

The carbon black can include particles having a particle size of about 1 to about 100 nm, for example about 10 to about 100 nm. Carbon black having a particle size of about 10 nm represented by FIG. 3 can be connected continuously to implement conductivity. Conductive carbon black with a particle size of about 20 to 50 nm and a continuous globular shape (i.e., without gaps between globular shapes) can also be used in exemplary embodiments.

In some embodiments, the carbon black may have a particle size of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 92, 92, 93, 94, 95, 96, 97, 98, 99 or 100 nm. Further, according to some embodiments of the present invention, the size of the carbon black particles can be in a range from about any of the foregoing sizes to about any other of the foregoing sizes.

Although the carbon black can have excellent electrical conductivity, its use can cause significant abrasions since carbon particles may easily break away by scratching or friction. However, when the carbon black is employed with the carbon nano-tubes, substantial electrical conductivity may be obtained while decreasing the amount of carbon black. Further, it was found that a microscopic electrical conductive three dimension network structure may be formed between the carbon fibrils of the carbon nano-tubes which can stabilize surface resistance and minimize particle shedding. That is, since the amount of carbon black inducing massive abrasion decreases and the structures of carbon fiber and carbon black can be stabilized through the three dimensional network, shedding of the particles can be prevented and, therefore, the abrasion resistance of the resin composition can significantly improve.

The abrasion exhibited by carbon nano-tubes, carbon black, and carbon nano-tubes and carbon black forming a network and a carbon black is compared as follows.

Carbon black alone>carbon nano-tube alone>a network formed by a carbon nano-tube and a carbon black The polycarbonate resin composition of the invention can include the carbon black in an amount of about 1 to about 20 parts by weight per 100 parts by weight of the base resin including polycarbonate (A) and styrene copolymer (B). In some embodiments, the polycarbonate resin composition may include the carbon black (D) in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the carbon black (D) can be in a range from about any of the foregoing amounts to about any other of the foregoing amounts.

When the amount of the carbon black is less than about 1 part by weight, it can be difficult to form the network and accordingly electric conductivity and abrasion resistance may decline. When the amount of the carbon black is more than about 20 parts by weight, abrasion resistance may decline because of the increased amount of carbon black can contribute to increased abrasion loss.

The polycarbonate resin composition can be prepared by mixing the components described herein and extruding through a conventional twin screw extruder (L/D=35, Φ=45 mm) into pellets. The resin pellets can be molded into a test specimen using a 10 oz injection molding machine at 280° C. injection temperature. The resultant specimen can have a surface resistance of E+5 or less measured according to ASTM D257. Also, pellets extruded at 280° C. can have an abrasion loss of about 30 mg or less measured under the conditions of a pressure of 3 Kgf, 1000 rpm, and 200° C. for 4 and a half hours.

Because the polycarbonate resin composition of the present invention can have excellent electric conductivity and/or abrasion resistance as above mentioned, the polycarbonate resin composition can be suitable to use as a material for the production of plastic articles used in environments in which static electricity is easily generated and abrasion is readily induced, for example, for wafers, IC chips, tray materials to transfer electric parts, and the like.

The uses of the polycarbonate resin composition of the present invention are not limited to the foregoing, and the polycarbonate resin can be used in any application requiring electric conductivity and/or abrasion resistance, for example, various electric parts, machinery parts, housing materials and the like.

The invention may be better understood by reference to the following examples which are intended for the purpose of illustration and are not to be construed as in any way limiting the scope of the present invention, which is defined in the claims appended hereto.

EXAMPLES

The polycarbonate resin, the styrene copolymer resin, the carbon fiber and carbon black used in following examples and comparative examples are given below:

(A) Polycarbonate

PANLITE L-1225WX with a weight average molecular weight of 22,000 g/mol manufactured by Teijin Ltd. is used.

(B) Styrene Copolymer Resin

Styrene copolymer resin with a weight average molecular weight of 130,000 g/mol including 71 parts by weight of styrene and 29 parts by weight of acrylonitrile is used.

(C) Carbon Nano-Tubes

Multi-walled carbon nano-tubes with an average external diameter of 5~30 nm and average length of 1~25 μm manufactured by Nanocyl Ltd. (product name NC-7000) are used.

(D) Conductive Carbon Black

A conductive carbon black in the form of globular particles with an average diameter of 20~50 nm connected to one other to develop a network structure, manufactured by TIMCAL Ltd. (product name ENSACO 250G) is used.

The components as shown in Table 1 and 2 are mixed with antioxidant and heat stabilizer to form a thermoplastic resin composition, and then each thermoplastic resin composition is extruded through a conventional twin extruder (L/D=35, Φ=45 mm) into pellets. The resin pellets are molded into a test specimen using a 10 oz injection molding machine at 280° C. to measure the electrical conductivity and various physical properties. After exposure at 23° C. and 50% relative humidity for 28 hours, the electrical conductivity and the physical properties of the test specimens are measured according to ASTM standards and the results are shown in Table 1 and 2 below.

A detailed explanation of each test standard used is as follows.

1) Surface resistance (Ω/sq): The surface resistance of each specimen is measured according to ASTM D257 using SRM-100 of Wolfgang Warmbier Ltd.

2) Abrasion loss: a specimen is measured under conditions of 3 Kgf pressure, 1000 rpm, and 200° C. for 4 and a half hours using a machine measuring abrasion resistance Produced by Cheil Industrial Inc.

TABLE 1

| Component | Classification | Examples | | | | |
| --- | --- | --- | --- | --- | --- | --- |
| | | 1 | 2 | 3 | 4 | 5 |
| Composition | (A) Polycarbonate resin | 90 | 90 | 70 | 50 | 70 |
| | (B) Styrene copolymer resin | 10 | 10 | 30 | 50 | 30 |
| | (C) Carbon nano-tube | 0.1 | 0.5 | 0.5 | 0.5 | 3 |
| | (D) Conductive carbon black | 20 | 10 | 10 | 10 | 1 |
| Physical properties | Surface resistance (Ω/sq.) | E+4 | E+4 | E+4 | E+4 | E+4 |
| | Abrasion (mg) | 25 | 20 | 12 | 8 | 15 |

TABLE 2

| Component | Classification | Comparative Examples | | | | | |
| --- | --- | --- | --- | --- | --- | --- | --- |
| | | 1 | 2 | 3 | 4 | 5 | 6 |
| Composition | (A) Polycarbonate resin | 100 | 100 | 100 | 40 | 90 | 70 |
| | (B) Styrene copolymer resin | — | — | — | 60 | 10 | 30 |
| | (C) Carbon nano-tube | — | — | 0.5 | 0.5 | — | 0.5 |
| | (D) Conductive carbon black | 10 | 20 | 10 | 10 | 10 | — |
| Physical properties | Surface resistance (Ω/sq.) | E+12 | E+4 | E+4 | E+10 | E+12 | E+12 |
| | Abrasion (mg) | 100 | 197 | 105 | 8 | 35 | 18 |

Figure 2:
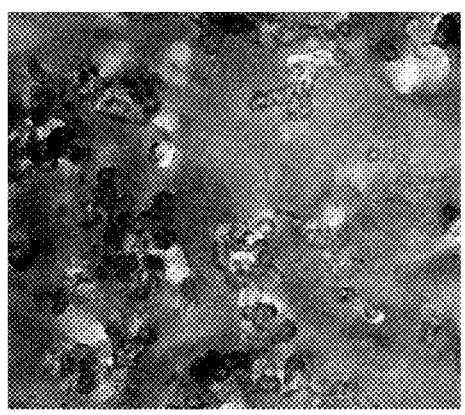
FIG. 2 is a transmission electron microscope (TEM) photograph of an enlarged portion of the surface of Example 1, illustrating a network formed by carbon fiber and carbon black.
Figure 3:
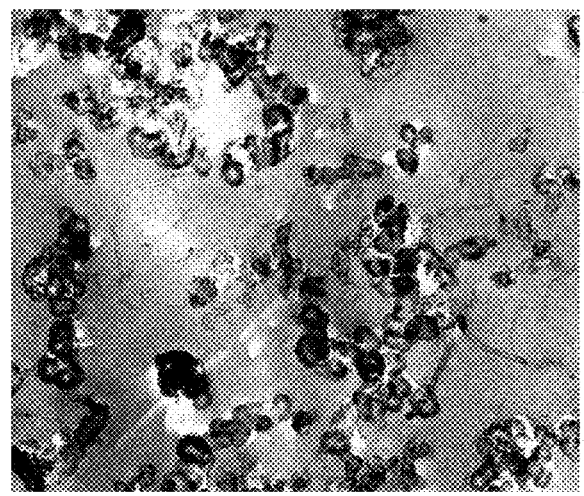
FIG. 3 is a transmission electron microscope (TEM) photograph of an enlarged portion of a surface of Example 2, illustrating a network formed by carbon fiber and carbon black.
Figure 4:
FIG. 4 is a transmission electron microscope (TEM) photograph of an enlarged portion of a surface of Example 3, illustrating a network formed by carbon fiber and carbon black.

FIGS. 1-4 illustrate the surface of sliced tensile specimens of the polycarbonate resin composition according to the present invention observed using a FE-TEM (Field Electron Transmission Electron Microscope) manufactured by Jeol Ltd. In particular, FIGS. 1(a), (b), and (c) are transmission electron microscope (TEM) photographs of surfaces of Examples 1, 2, and 3, respectively. FIGS. 2, 3, and 4 are TEM photographs of an enlarged portion of the surface of Examples 1, 2, and 3, respectfully, illustrating the network formed by carbon fiber and carbon black in each sample.

As shown in Tables 1 and 2, Examples 1-5 exhibit significantly improved electrical conductivity and wear resistance (i.e., Examples 1-5 have low surface resistance and little abrasion loss). In contrast, Comparative Examples 5 and 6 which do not include carbon nano-tubes or carbon black have high surface resistance and large abrasion loss. Further, Comparative 3 which does not include a styrene copolymer resin has excellent electrical conductivity, but also deterioration of abrasion resistance. In addition, Comparative 4 comprising polycarbonate and styrene copolymer resin in amounts outside of the amounts of the present invention has deteriorated electrical conductivity because of the small amount of polycarbonate including conductive filler. In addition, Comparative 1 and 2 which do not include both styrene copolymer resin and carbon nano-tube have deteriorated electrical conductivity and abrasion resistance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
    a base resin comprising about 70 to about 95% by weight of a (A) polycarbonate and about 30 to about 55% by weight of a (B) styrene copolymer resin including about 60 to about 90% by weight of styrene based monomer and about 10 to about 40% by weight of unsaturated-nitrile based monomer,
    (C) about 0.01 to about 5 parts by weight of carbon nano-tubes, and
    (D) about 1 to about 20 parts by weight of carbon black,
    wherein the amounts of carbon nano-tubes (C) and carbon black (D) are based on 100 parts by weight of the base resin, and
    wherein the carbon nano-tubes and the carbon black form a three dimensional network structure.

2. The polycarbonate resin composition of claim 1, wherein the carbon nano-tubes include single wall carbon nano-tubes, double wall carbon nano-tubes, multi wall carbon nano-tubes, cup-stacked carbon nano-fibers shaped in a hollow form with an interior with multiple layers of truncated cone graphenes stacked therein and combinations thereof.

3. The polycarbonate resin composition of claim 1, wherein the carbon black is conductive globular carbon black having a particle size of about 1 to about 100 nm.

4. The polycarbonate resin composition of claim 3, wherein the carbon black is conductive globular carbon black without gaps between globular shapes.

5. The polycarbonate resin composition of claim 1, wherein pellets formed of the same by extruding and molding the polycarbonate resin composition at a 280° C. injection temperature have a surface resistance of E+5 or less measured according to ASTM D257.

6. The polycarbonate resin composition of claim 5, wherein pellets formed of the same by extruding and molding the polycarbonate resin composition at a 280° C. injection temperature have an abrasion loss of about 30 mg or less measured under conditions of 3 Kgf pressure, 1000 rpm, and 200° C. for 4 and a half hours.

7. A polycarbonate resin composition comprising:
    a base resin comprising about 70 to about 95% by weight of a (A) polycarbonate and about 30 to about 55% by weight of a (B) styrene copolymer resin including about 60 to about 90% by weight of styrene based monomer and about 10 to about 40% by weight of unsaturated-nitrile based monomer,
    (C) about 0.01 to about 5 parts by weight of carbon nano-tubes, and
    (D) about 1 to about 20 parts by weight of carbon black,
    wherein the amounts of carbon nano-tubes (C) and carbon black (D) are based on 100 parts by weight of the base resin,
    wherein the carbon nano-tubes and the carbon black form a three dimensional network structure, and
    wherein the carbon black is conductive globular carbon black having a particle size of about 1 to about 100 nm.

* * * * *